J. E. HALE AND E. F. BRUNNER.
REINFORCEMENT FOR CUSHION TIRES.
APPLICATION FILED JUNE 11, 1917.
1,319,865.
Patented Oct. 28, 1919.
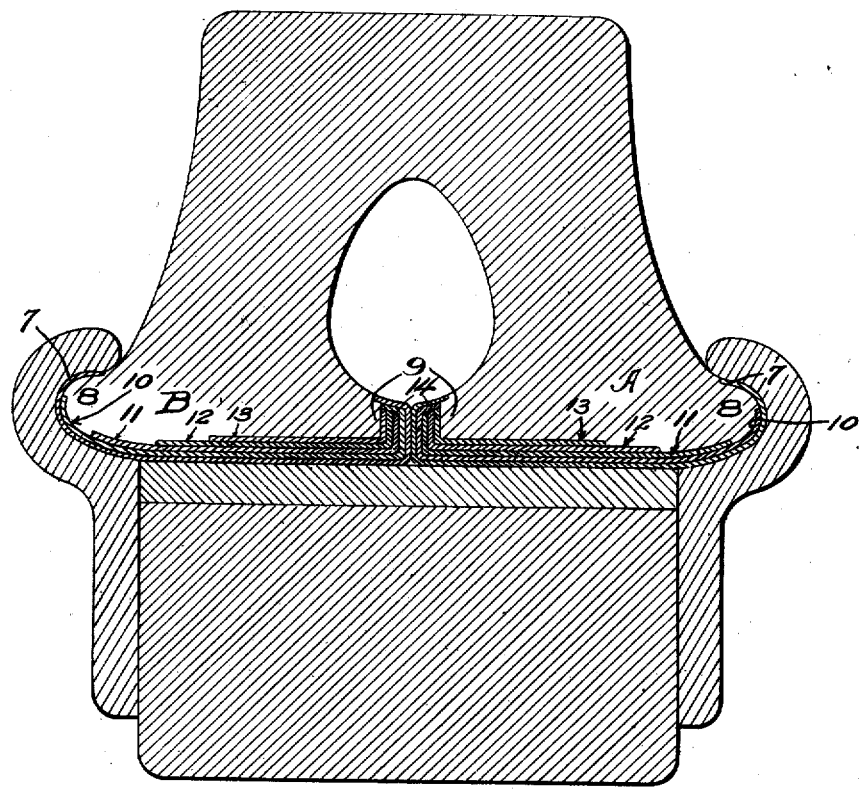
Inventors
James E. Hale and
Elmer F. Brunner.
Witnesses:
By C. S. Landon
Their Attorney

UNITED STATES PATENT OFFICE.

JAMES E. HALE AND ELMER F. BRUNNER, OF AKRON, OHIO, ASSIGNORS TO THE GOODYEAR TIRE & RUBBER COMPANY, OF AKRON, OHIO, A CORPORATION OF OHIO.

REINFORCEMENT FOR CUSHION-TIRES.

1,319,865.  Specification of Letters Patent.  Patented Oct. 28, 1919.

Application filed June 11, 1917. Serial No. 174,047.

*To all whom it may concern:*

Be it known that we, JAMES E. HALE and ELMER F. BRUNNER, citizens of the United States, residing at Akron, in the county of Summit and State of Ohio, have invented new and useful Improvements in Base-Reinforcements for Cushion-Tires, of which the following is a specification.

Our present invention relates to a cushion tire construction involving a fabric reinforced and stiffened base of such nature that the tire clamping means heretofore customarily employed in conjunction with certain classes of cushion tires may be dispensed with without loss of function.

In cushion tires formed with an internal cavity of the type in which the base of the tire is formed of a pair of separate annular portions, individually joined to a common tread portion by respective annular side walls, such as the tire illustrated in the pending application of James E. Hale, filed May 13, 1916, Serial No. 97,334, it has been customary to employ a clamping ring which engaged both of the inner edges of the separate bases. The function of this clamping ring is to prevent the inner base edges of the tire from so curling up into the cavity or overriding one another as to release the outer base edges from the clamping side flanges which are utilized to maintain the tire upon its wheel felly. We have discovered, however, that this inner clamping ring may be dispensed with by the use of fabric inserts so placed along the inner base edges as to simulate, in cross sectional view, the clamp itself, and to so stiffen the tire at the points usually engaged by the clamp as to render the use of any such extraneous fastening device unnecessary.

Moreover, we have found that by a proper improvement of the plies of fabric frequently incorporated into the individual base portions of a cushion tire of this type, these plies may be made to take upon themselves the added function of replacing the inner clamp ring as well as serving their more usual office of strengthening the separate base portions of the tire against the lateral compression of the side rings.

As the principal object, accordingly, we propose to incorporate into the individual base portions of the type of cushion tire above referred to, fabric plies which are arranged not only parallel to the felly band of the wheel but also in planes centrally vertical thereto in order to provi..e on the inner flanges of the base portion, abutments of such stiffness that no danger of displacement of these abutments into the inner cavity of the tire need be anticipated.

The above and additional objects of a similar nature, which will be hereinafter more specifically treated, are preferably accomplished by such means as are illustrated in the accompanying drawings, described in the following specification, and then more particularly pointed out in the claims which are appended hereto and form a part of this application.

In the drawing the figure is a cross sectional view of a cushion tire as constructed in accordance with the tenets of this invention.

In the pending application of James E. Hale above referred to there is illustrated a method of employing successive layers of fabric reinforcement in the individual base portions of a cushion tire of a type to which the present invention is pertinent. The main function of these fabric inserts in the pending Hale application is that of providing a graduated reinforcement for each base portion which is exteriorly elastic but which is substantially stiffened from a point adjacent to the exterior of the tire bases in degree diminishing into the respective side walls upon which the bases are carried.

In our present invention this function of the fabric strips is not interfered with but an added function is delegated to the fabric inserts and is accomplished by the particular construction and arrangement of the fabric reinforcement not heretofore contemplated.

We preferably reinforce each of the separate base portions A and B of the cushion tire with an exterior ply of fabric 7 extending from the outer bead edge 8 of each of the separate tire bases completely around the base and along the inner bead edge 9 thereof. Successive fabric strips 10, 11, 12, and 13 are provided as interior layers of gradually diminishing width for each of the base portions A and B, in much the same manner as disclosed in the mentioned application, which it is the intention of this invention to improve. Each of the interiorly arranged fabric strips 10, 11, 12, and 13, however, have one constructional difference in comparison with the corresponding reinforcing strips of the pending application Serial No. 97,334, which is to be seen in the arrangement of the inner edge of each strip or ply in vertical fashion denoted as a whole by the numeral 14. In the space between the inner beads 9 of the base portions the vertical extremities of these horizontal strips are closely compacted on the inner bead 9 of each of the base portions A and B and serve to provide a vertical reinforcement or abutment for these inner beads which results in a stiffening thereof to such an extent that the inner clamp ring previously employed by Hale in his cushioning cavity may be wholly dispensed with. It is not only that the inner beads are reinforced by the fabric inserts in the present invention which renders the latter capable of avoiding the use of the clamp ring, but also the fact that such reinforcements as are herein provided are of such a nature as to simulate the stiffening of these inner beads which was provided solely by the inner clamp ring in the previous tires of this type.

The abutments on the inner beads 9 of the separate base portions A and B are juxtaposed or contiguous in the present invention instead of being separated by a stem or clamp ring as in previously evolved types of this tire. When so contiguous the individual abutments on the inner beads 9 combine to provide a reinforcement as a whole which is capable of resisting any stress on that part of the tire tending to displace them from the position illustrated.

What we claim is:

1. A cushion tire provided with an inner cavity and separate base portions, each of said base portions having an outer portion and an inner bead portion, and a reinforcing means for each base portion extending from the outer edge portion to the inner bead portion, said reinforcing means gradually increasing in thickness toward the said inner bead portion and having a portion bent substantially at right angles around said inner bead portion to form abutments, whereby said inner bead portions are held in spaced relation to each other.

2. A cushion tire provided with an inner cavity and separate base portions, each of said base portions having an outer edge and an inner bead portion, and a reinforcing means for each separate base portion including superposed fabric plies, each successive ply of relatively greater width from the innermost to the outermost, the inner edge of each ply being bent at an angle around and against said inner bead portion to form abutments between said separate base portions whereby said inner beads are held in spaced relation to each other.

3. A cushion tire provided with an inner cavity and separate base portions, each of said base portions having an outer bead portion and an inner bead portion, and reinforcing means incorporated in each separate base portion including superposed fabric plies of sucessively decreasing width, extending from around the outer bead portion to and around the inner bead portion, the inner edge of each ply being bent at an angle against said inner bead portion to form vertical abutments between said separate base portions whereby said inner beads are held in spaced relation to each other.

In testimony whereof we have signed our names in the presence of two subscribing witnesses.

JAMES E. HALE.
ELMER F. BRUNNER.

Witnesses:
W. E. SHIVELY,
J. E. KEATING.